United States Patent Office 3,089,714
Patented May 14, 1963

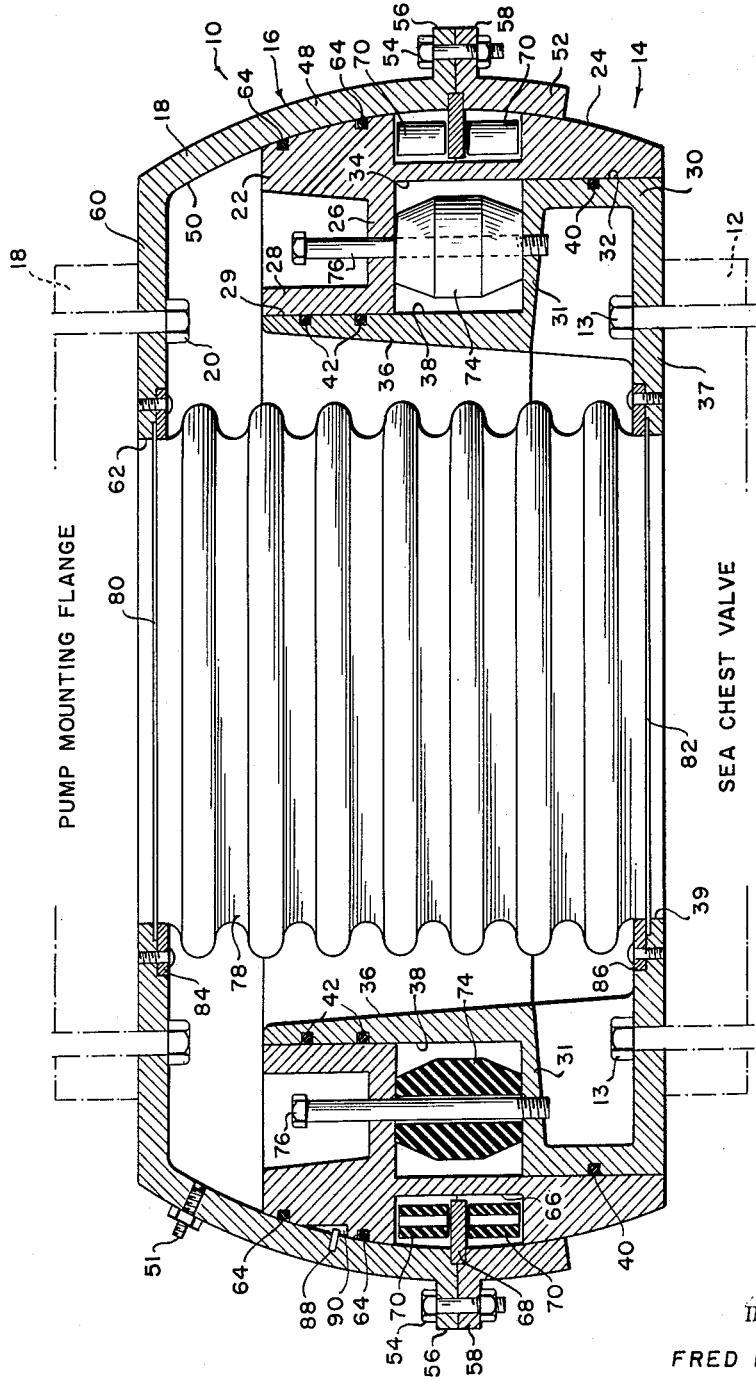

3,089,714
BELLOWS CONTAINED WITHIN A COMPOSITE
BALL IN A SOCKET
Fred E. Croy, 814 Taylor Ave., Annapolis, Md.
Filed Mar. 23, 1960, Ser. No. 17,235
3 Claims. (Cl. 285—165)
(Granted under Title 35, U.S. Code (1952), sec. 266)

The invention described herein may be manufactured and used by or for the Government of the United States of America for governmental purposes without the payment of any royalties thereon or therefor.

This invention relates to a flexible coupling and more particularly to a combination flexible, shock absorbent coupling and universal joint adapted to be used as a pump mounting device for flexibly connecting a pump to a base.

In accordance with the instant invention, the coupling comprises a ball and socket arrangement adapted to provide substantially universal pivotal movement, of a limited nature, by a pump relative to a deck or the like to which it is attached. The ball portion of the invention includes a pair of members telescopically mounted within one another and shock insulated from one another by shock absorbing means so as to provide a combination shock absorbing and universally movable coupling between a pump for example and the deck of a ship or the like. It is emphasized that while the instant invention relates primarily to connecting a pump to the deck of a ship, it is adapted for use in connecting any type of fluid receiving apparatus to a fluid supply source where it is desirable to shock insulate said fluid receiving apparatus from shock transmitting surrounding structures.

An object of this invention is to provide a flexible connecting means between a pump or the like and a stationary supporting structure, such as the deck of a ship.

A further object of this invention is to provide a shock absorbent mounting for a pump or the like.

Still another object of this invention is to provide a shock absorbent fluid conducting mounting for a pump or the like.

An additional object of this invention is to provide a pivotal connecting member for connecting a pump or the like to a supporting structure.

Still an additional object of this invention is to provide a pivotal connecting member for connecting a pump or the like to a supporting structure, said connecting member including shock absorbing means for absorbing shock transmitted from said supporting structure to said pump.

Other objects and many of the attendant advantages of this invention will be readily appreciated as the same becomes better understood by reference to the following detailed description when considered in connection with the accompanying drawing wherein is shown a transverse sectional view of a pump mounting constructed in accordance with this invention. The FIGURE in the drawing is symmetrical about the plane on which the sectional view is taken, and therefore only a single elevational, sectional view is shown.

Referring now to the drawing wherein like reference characters designate like or corresponding parts, there is shown a pump mounting or coupling 10 bolted to a flange 12 on a sea-chest valve or some other source of fluid supplied. The flange 12 and associated structure is not shown in detail since it does not form a part of this invention.

The coupling assembly 10 comprises a ball assembly 14 movably fitted within a socket assembly 16. The socket assembly is in turn connected to either a pump mounting flange 18, or the flange of any other fluid receiving apparatus, by a plurality of bolts 20.

The ball assembly 14 comprises an outer substantially annular ball element 22 having an outer spherical surface, and an inwardly directed annular flange 26 having at its innermost edge an upwardly directed flange 28. The flange 28 is provided with a cylindrical innermost surface 29 for purposes hereinafter described.

The ball assembly 14 further comprises an inner substantially annular member 30 telescopically mounted within the outer annular member 22 and having an inwardly extending flange 31, and a lower, outer peripheral surface 32 in sliding surface contact with an inner surface 34 on the interior of the annular member 22. In addition, the inner member 30 of the ball assembly 14 is provided with an upwardly extending cylindrical sleeve 36 having an outer peripheral surface 38 in sliding surface contact with the inner surface 29 of the flange 28 on the outer ball 22.

The inner element 30 is also provided, at its lower end, with an inwardly extending flange 37 having a hole 39 extending substantially through the center thereof.

A fluid tight seal is provided between the outer surface 32 of the member 30 and the surface 34 of the element 22 by an O-ring 40 mounted within a suitable annular groove formed in the surface 32. In addition, a fluid-tight seal is insured between the surface 38 of the sleeve 36 and the inner surface 29 of the flange 28 by the use of one or more O-rings 42 located in suitably provided annular grooves formed in the surface 38.

The outer socket member 16 comprises an upper socket section 48 that is substantially annular in form and has an inner spherical surface 50 that conforms to and is in sliding contact with the outer surface 24 of the ball element 22. The section 48 is provided with a vent plug 51 to which an indicating device may be attached so as to indicate fluid leakage within the coupling. In order to render the socket member 16 disconnectable from the ball element 14, the socket member further comprises a lower annular section 52 having an inner spherical surface that conforms to the surface 50. The sections 48 and 52 are separably connected together by a plurality of bolts 54 that extend through suitably formed flanges 56 and 58 formed on the socket sections 48 and 52 respectively. In addition the socket section 48 is provided with an inwardly extending flange 60 and its upper end, to which the pump mounting flange 18 is adapted to be connected and in which a hole 62 is formed substantially the same size as, and in alignment with the hole 39 in the lower flange 37.

A fluid tight seal between the relatively slidable ball and socket members is provided by a plurality of O-rings 64 seated in suitably provided annular grooves formed in the ball element 22 adjacent its uppermost end.

Additional structure is provided to limit the relative pivotal movement between the ball and socket elements 14 and 16. This latter structure includes an annular groove 66 formed in the outer surface of the ball element 22. An annular ring 68 is clamped at its outer periphery between the socket elements 48 and 52 and extends into the groove 66, essentially dividing such groove into two portions. In order to arrest movement of the annular ring 68 within the groove 66, and thus rotational movement of the socket 16 relative to the ball 14, and to absorb violent rotational movements between the ball and socket members, there is provided a plurality of resilient torus-like shock absorbing members 70, made of rubber or the like, between the perspective surfaces of the annular ring 68 and the respective juxtaposed side surfaces of the groove 66. It is pointed out that though a continuous groove 66 is described above, a series of peripherally spaced recesses may be substituted therefor, each of which would have an arrangement therein corresponding to elements 68 and 70.

Thus the instant invention includes relatively movable ball and socket elements, and means for absorbing violent movements of one element relative to the other, namely the shock absorbing resilient members 70 and the annular ring 68.

In order to provide means for absorbing shock and/or vibrations transmitted longitudinally of the axis of the instant coupling 10, there is provided a plurality of torus or doughnut like, resilient shock absorbing elements 74 located between the lower surface of the flange 26 on the ball element 22 and the upper surface of the flange 31 provided on the socket element 30. Thus when shock and/or vibration is transmitted from the flange 12 to the element 30, relative movement between said element 30 and the outer ball element 22 is arrested and absorbed by compression is the tori 74 between the flanges 26 and 31. Each of the tori 74 is held in place by a headed, elongated bolt 76 that slidably extends through the flange 26 and the torus 74 and has an end portion threadedly mounted within the flange 31.

The bolts 76 serve a further function, namely to prevent excessive separation between the ball elements 22 and 30, by the interaction of the head portion of each bolt with the upper surface of the flange 26.

Fluid is adapted to be conducted through the coupling 10, from the sea-chest valve or the like, to the pump mounted on the top of the coupling by means of a bellows 78 extending through the center of the coupling and having its upper edge fitted within the hole 62 and its lower edge fitted within the hole 39. The bellows 78 has flanges 80 and 82 at its upper and lower ends respectively. The flanges 80 and 82 are clamped to the coupling flanges 60 and 37 respectively by means of a pair of annular rings 84 and 86 bolted to said coupling flanges. The bellows 78 functions in the well known manner allowing conventional ball and socket swivel movement between ball element 14 and the socket element 16, and at the same time allowing longitudinal movement of the inner ball element 30 relative to the outer ball element 22.

In order to prevent twisting of the ball and socket elements relative to one another, and thereby prevent twisting of the bellows 78, one or more inwardly projecting pins 88 are fixedly mounted on the inner surface 50 of the socket member 48 and are slidably mounted in cooperating slots 90 formed in the outer surface of the ball element 22.

Relative twisting between the ball elements 22 and 30 is prevented by the bolts 76.

Thus the instant invention provides a relatively simple shock and vibration absorbent coupling for connecting a pump or the like to a base member so as to prevent transmission of said shock and/or vibration from said base member to said pump.

The instant invention also includes a ball and socket arrangement that allows the pump or the like to swivel somewhat relative to the base to which it is attached, and at the same time provides shock absorbent swivel limiting means, 68 and 70 to prevent an excess of such movement.

Obviously many modifications and variations of the present invention are possible in the light of the above teachings. It is therefore to be understood that within the scope of the appended claims the invention may be practiced otherwise than as specifically described.

What is claimed is:

1. A flexible conduit coupling comprising the combination of a socket assembly and a ball assembly, said socket assembly including a first socket part having a truncated spherical cavity therein, a radially inner portion forming a flat portion extending transversely inward toward said cavity and terminating in a central aperture adapted to receive a conduit and a radially outer portion on said first socket part forming a flange portion extending transversely outward from said cavity, a second socket part having a truncated spherical cavity therein which corresponds in size to, and thus forms a continuous segmental spherical surface with the cavity of said first socket part, a radially outer portion on said second socket part forming a flange portion which mates with the flange of the first socket part, an annular ring having its outer portion clamped between said flanges and having its inner portion extending into the composite spherical cavity formed by said two socket parts, and fastening means clamping said flanges together; said ball asembly including an outer part having a segmented spherical outer surface with an annular groove therein dividing the outer surface into an upper and a lower bearing surface, the upper bearing surface mating with the cavity of said first socket part, the lower bearing surface mating with the cavity of said second socket part, and said annular groove surrounding said annular ring, resilient shock absorbing means freely mounted within said annular groove on both sides of said annular ring to cushion and limit relative movement between said ball and said socket, said outer part also having an internal bore and internal shoulder, said ball assembly also including an inner part telescopically mounted within the internal bore of the outer part, said ball inner part including a shoulder in spaced juxtaposition with said outer part internal shoulder, and a flat portion extending parallel to said first socket part radially inner portion and having a central aperture therein in alignment with said first socket part central aperture, and resilient shock absorbing means interposed between the shoulders on said inner and outer ball parts to limit telescopic movement of said parts.

2. A flexible conduit coupling as defined in claim 1 but further characterized by a tubular conduit interconnected to and extending between said central apertures, and thus adopted to transfer fluid through said coupling out of contact with said ball and socket bearing surfaces.

3. A flexible conduit coupling as defined in claim 1 but further characterized by at least one slot in the upper bearing surface of said ball outer part, and at least one associated pin mounted in said first socket part and extending into said slot, said slot and pin cooperating to limit axial rotational movement of said ball assembly about the axis extending between the central apertures.

References Cited in the file of this patent

UNITED STATES PATENTS

| | | |
|---|---|---|
| 275,776 | Kruest | Apr. 10, 1883 |
| 486,986 | Schinke | Nov. 29, 1892 |
| 659,590 | Muhlberg | Oct. 9, 1900 |
| 989,610 | Van Kando | Apr. 18, 1911 |
| 1,425,635 | Dod | Aug. 15, 1922 |
| 1,929,635 | Goff | Oct. 10, 1933 |
| 2,067,768 | Krefft | Jan. 12, 1937 |
| 2,266,383 | Quintrell | Dec. 16, 1941 |
| 2,421,691 | Gibson | June 3, 1947 |
| 2,485,408 | Pezzillo | Oct. 18, 1949 |
| 2,565,296 | Chyle | Aug. 21, 1951 |
| 2,931,672 | Merritt et al. | Apr. 5, 1960 |
| 3,038,743 | Zaloumis | June 12, 1962 |

FOREIGN PATENTS

| | | |
|---|---|---|
| 24,687 | Great Britain | Sept. 27, 1906 |